United States Patent [19]

Kuroda et al.

[11] Patent Number: 5,611,310

[45] Date of Patent: Mar. 18, 1997

[54] DRIVING FORCE-CALCULATING SYSTEM AND CONTROL SYSTEM INCORPORATING SAME FOR AUTOMOTIVE VEHICLES

[75] Inventors: Shigetaka Kuroda; Hisashi Igarashi; Akira Katoh; Kenichiro Ishii, all of Wako, Japan

[73] Assignee: Honda Giken Kogyo Kabushiki Kaisha, Tokyo, Japan

[21] Appl. No.: 583,745

[22] Filed: Jan. 17, 1996

[30] Foreign Application Priority Data

Jan. 18, 1995  [JP]  Japan .................................. 7-023427

[51] Int. Cl.$^6$ ........................................................ F02D 7/00
[52] U.S. Cl. ............................................................ 123/399
[58] Field of Search ........................................ 123/399, 361, 123/352; 180/178, 179; 477/111

[56] References Cited

U.S. PATENT DOCUMENTS

| | | | |
|---|---|---|---|
| 5,414,049 | 5/1995 | Kamio et al. | 477/111 |
| 5,454,358 | 10/1995 | Hattori et al. | 123/399 |
| 5,477,825 | 12/1995 | Hattori et al. | 123/399 |
| 5,526,787 | 6/1996 | Pallett | 123/399 |
| 5,546,231 | 10/1996 | Suzuki et al. | 123/399 |

FOREIGN PATENT DOCUMENTS 1-113561  5/1989  Japan .
3-163256  7/1991  Japan .

*Primary Examiner*—Raymond A. Nelli
*Attorney, Agent, or Firm*—Armstrong, Westerman Hattori, McLeland & Naughton

[57] ABSTRACT

A driving force-calculating system calculates a desired driving force required by an automotive vehicle depending on operating conditions of the vehicle. A kinetic energy parameter representative of kinetic energy of the vehicle is calculated from an amount of change in speed of the vehicle assumed during acceleration of the vehicle. A correction coefficient is calculated based on an average value of a maximal value of the kinetic energy parameter assumed within a predetermined time period. The desired driving force required by the vehicle is calculated by the use of the correction coefficient. A control system for automotive vehicles which incorporates the driving force-calculating system is also provided.

20 Claims, 13 Drawing Sheets

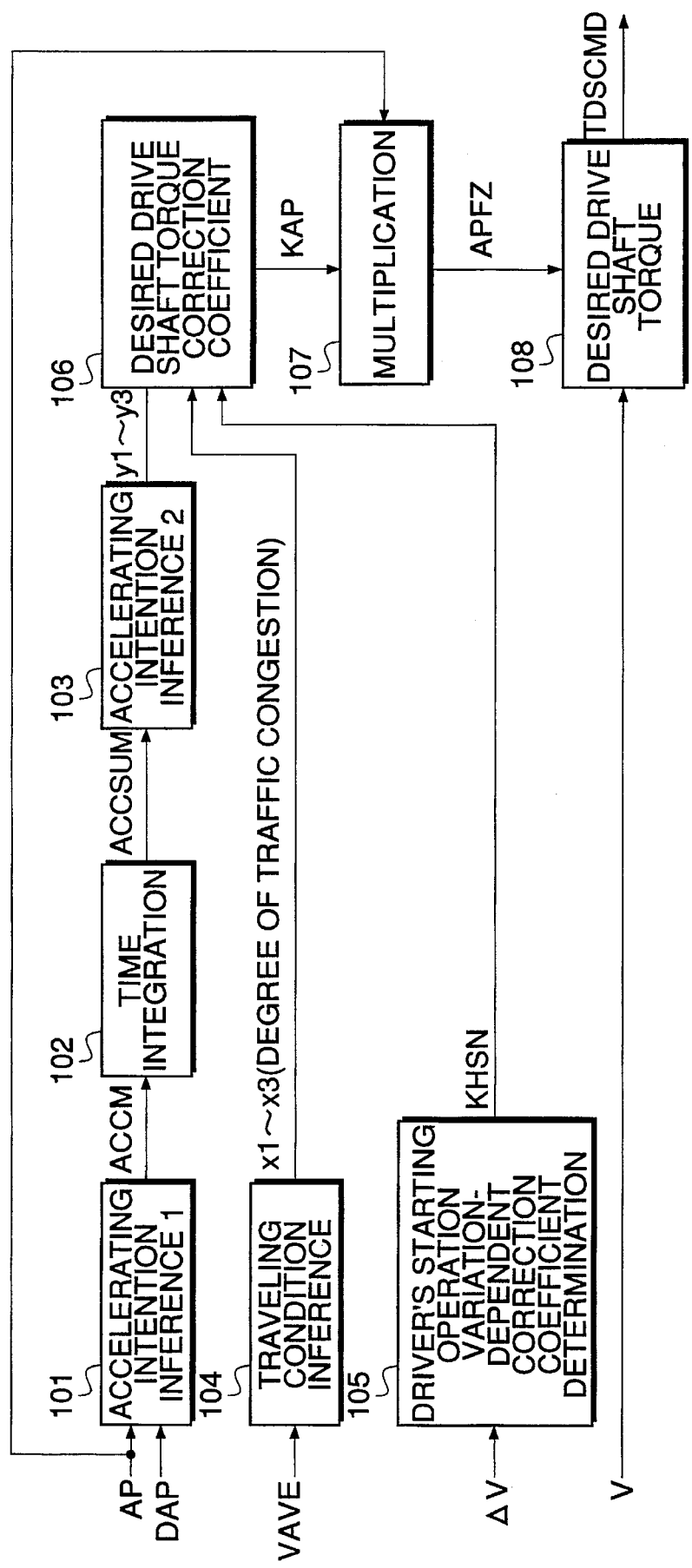

FIG.9
|  | v1 | v2 |
|---|---|---|
| u1 | w11 | w12 |
| u2 | w21 | w22 |
FIG.10A
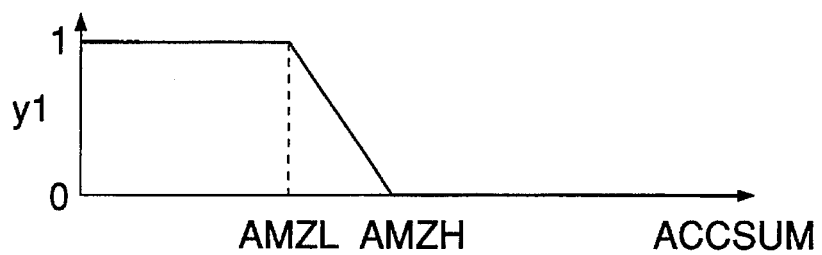
FIG.10B
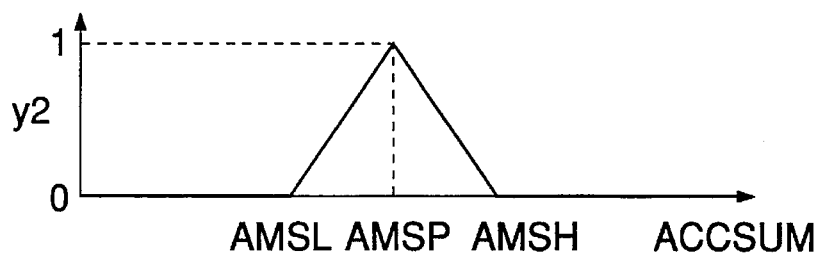
FIG.10C
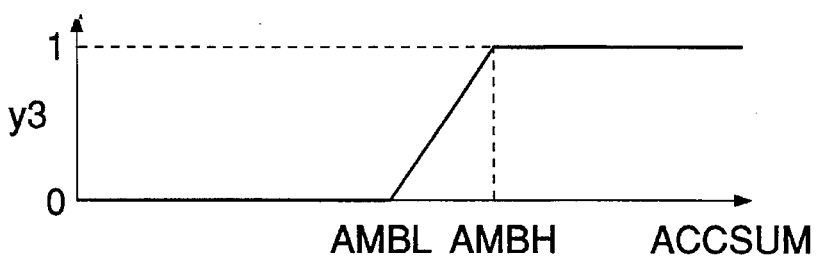

FIG.12
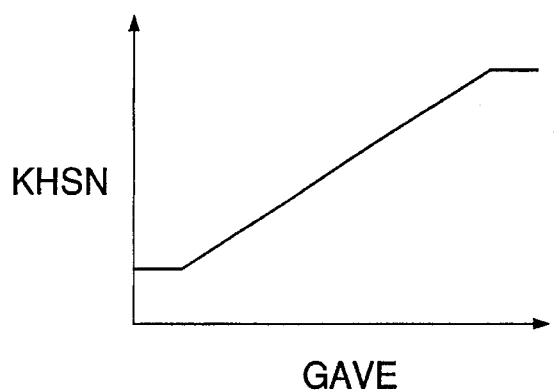
FIG.15A ACCELERATOR POSITION AP (degree)
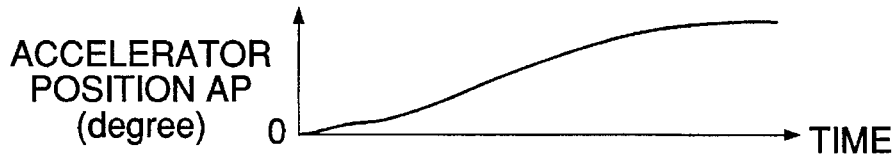
FIG.15B VEHICLE SPEED V (km/h)
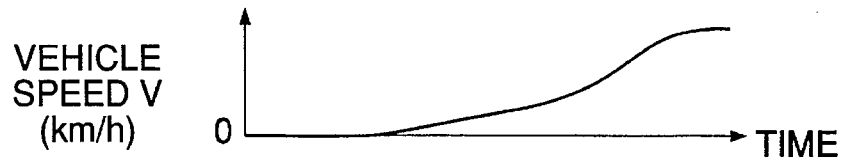
FIG.15C ACCELERATION G
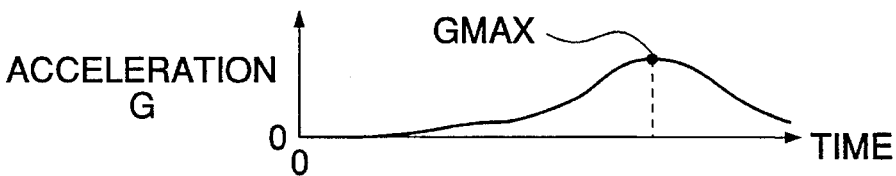

FIG.14A

|    | y1  | y2  | y3  |
|----|-----|-----|-----|
| x1 | α11 | α12 | α13 |
| x2 | α21 | α22 | α23 |
| x3 | α31 | α32 | α33 |

FIG.14B

|        | V0     | V1     | ........ | V21     |
|--------|--------|--------|----------|---------|
| APFZ0  | TDS00  | TDS01  | ........ | TDS021  |
| APFZ1  | TDS10  | TDS11  | ........ | TDS121  |
| ⋮      | ⋮      | ⋮      | ⋱        | ⋮       |
| APFZ11 | TDS110 | TDS111 | ........ | TDS1121 |

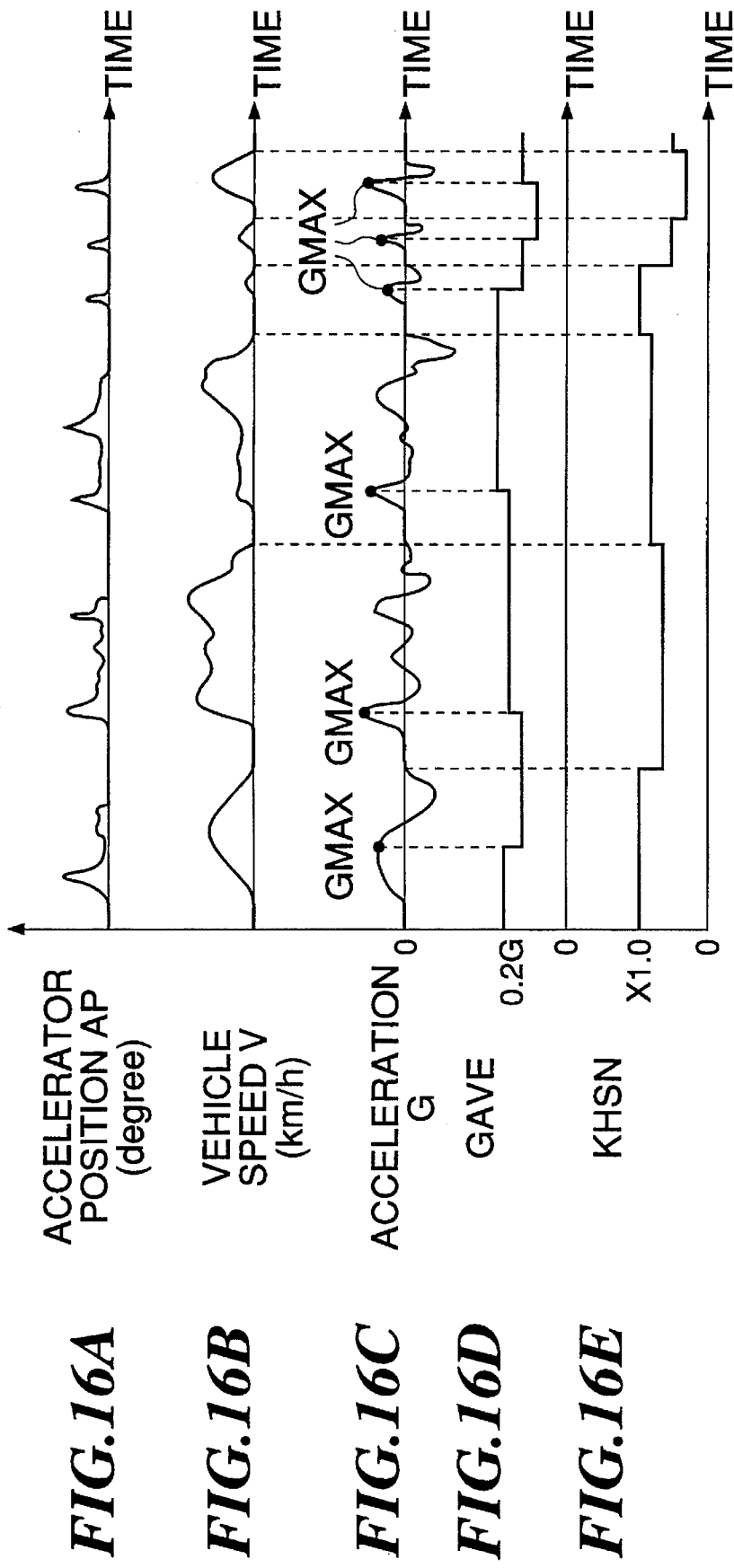

DRIVING FORCE-CALCULATING SYSTEM AND CONTROL SYSTEM INCORPORATING SAME FOR AUTOMOTIVE VEHICLES

BACKGROUND OF THE INVENTION

1. Field of the Invention

This invention relates to a driving force-calculating system for automotive vehicles, which calculates a driving force required by the automotive vehicle (hereinafter referred to as "the desired driving force") depending on operating conditions of the vehicle, and a control system incorporating the same, and more particularly to a driving force-calculating system of this kind which calculates the driving force by the fuzzy inference, and a control system for automotive vehicles incorporating the same.

2. Prior Art

Conventionally, a control system for automotive vehicles has been proposed by Japanese Laid-Open Patent Publication (Kokai) No. 1-113561, which determines whether the vehicle is traveling on a congested road, a city street, a highway, a mountain road, or an expressway, and controls the fuel injection timing of an internal combustion engine installed on the vehicle depending on results of the determination to thereby control the output torque of the engine in a manner suitable for the type of traveling road. The proposed system employs the fuzzy inference to carry out the above determination based on the throttle valve opening, the vehicle speed, the rotational speed of the engine, and the gear position.

Another control system has been proposed by Japanese Laid-Open Patent Publication (Kokai) No. 3-163256 which determines the driving force required by an automotive vehicle by the use of the fuzzy inference, based on the amount of operation (stepping amount) of the accelerator pedal, an amount of change in the stepping amount, and the vehicle speed.

However, in the proposed systems, the desired driving force and the engine output torque are not corrected by the driver's characteristics (e.g. age, sex, and experience in driving). This makes it impossible to make the vehicle exhibit drivability so as to meet a wide range of requirements by drivers.

For example, even if the accelerator pedal is operated by drivers different in age or sex in an identical manner, it does not necessarily mean that they demand the same degree of acceleration by the operation. Further, even with drivers of the same age and the same sex, there can be variations in the degree of demand of acceleration between the drivers due to their different characteristics.

SUMMARY OF THE INVENTION

It is a first object of the invention to provide a driving force-calculating system for an automotive vehicle, which is capable of calculating a desired driving force of the vehicle in a manner suitable for individual drivers by taking each driver's characteristics into account.

It is a second object of the invention to provide a control system for an automotive vehicle, which is capable of controlling the driving force of the vehicle to a desired value in a manner suitable for individual drivers by taking each driver's characteristics into account.

To attain the first object, according to a first aspect of the invention, there is provided a driving force-calculating system for calculating a desired driving force required by an automotive vehicle depending on operating conditions of the vehicle.

The driving force-calculating system according to the first aspect of the invention is characterized by comprising:

vehicle speed change-calculating means for calculating an amount of change in speed of the automotive vehicle assumed during acceleration of the automotive vehicle;

parameter-calculating means for calculating a kinetic energy parameter representative of kinetic energy of the automotive vehicle from an output from the vehicle speed change-calculating means;

maximal value-calculating means for calculating a maximal value of an output from the parameter-calculating means within a predetermined time period;

maximal value-averaging means for calculating an average value of the maximal value calculated by the maximal value-calculating means;

correction coefficient-calculating means for calculating a correction coefficient based on the average value calculated by the maximal value-averaging means; and desired driving force-calculating means for calculating the desired driving force required by the automotive vehicle by the use of the correction coefficient calculated by the correction coefficient-calculating means.

Preferably, the kinetic energy parameter is acceleration of the automotive vehicle.

Alternatively, the kinetic energy parameter is a driving force obtained by multiplying the acceleration of the automotive vehicle by weight of the automotive vehicle.

More preferably, the vehicle has an accelerator pedal, the driving force-calculating system including stepping amount-detecting means for detecting a stepping amount of the accelerator pedal, the desired driving force-calculating means correcting the stepping amount of the accelerator pedal by the correction coefficient and calculating the desired driving force by the use of the corrected stepping amount of the accelerator pedal.

Further preferably, the maximal value-averaging means averages the maximal value during traveling of the vehicle, the correction coefficient-calculating means calculating the correction coefficient when the vehicle is in stoppage.

Preferably, the predetermined time period is a fixed time period elapsed immediately after the automotive vehicle starts from a standing state in which the speed of the automotive vehicle is zero.

More preferably, the driving force-calculating system includes accelerating intention-estimating means for calculating an estimated value of driver's intention of acceleration based on the stepping amount of the accelerator pedal and an amount of change in the stepping amount of the accelerator pedal, and the correction coefficient-calculating means calculates the correction coefficient based on a driver's starting operation variation-dependent correction coefficient calculated based on the estimated value of driver's intention of acceleration and the average value calculated by the maximal value-averaging means.

Further preferably, the driving force-calculating system includes traveling state-estimating means for calculating an estimated value of a traveling state of the automotive vehicle based on an average value of the speed of the automotive vehicle, the correction coefficient-calculating means calculating the correction coefficient additionally based on the estimated value of the traveling state of the automotive vehicle.

More preferably, the desired driving force-calculating means calculates the desired driving force required by the automotive vehicle based on the corrected stepping amount of the accelerator pedal and the speed of the automotive vehicle.

To attain the second object of the invention, according to a second aspect of the invention, there is provided a control system for an automotive vehicle having an internal combustion engine installed thereon, the engine having an intake passage, a throttle valve arranged in the intake passage, throttle valve-driving means for driving the throttle valve, desired throttle valve opening-calculating means for calculating a desired throttle valve opening value for the throttle valve-driving means, and control means for controlling the throttle valve-driving means such that an actual opening value of the throttle valve becomes equal to the desired throttle valve opening value, the control system including a driving force-calculating system for calculating the desired driving force depending on operating conditions of the vehicle.

The control system according to the second aspect of the invention characterized by comprising:

vehicle speed change-calculating means for calculating an amount of change in speed of the automotive vehicle assumed during acceleration of the automotive vehicle;

parameter-calculating means for calculating a kinetic energy parameter representative of kinetic energy of the automotive vehicle from an output from the vehicle speed change-calculating means;

maximal value-calculating means for calculating a maximal value of an output from the parameter-calculating means within a predetermined time period;

maximal value-averaging means for calculating an average value of the maximal value calculated by the maximal value-calculating means;

correction coefficient-calculating means for calculating a correction coefficient based on the average value calculated by the maximal value-averaging means; and desired driving force-calculating means for calculating the desired driving force required by the automotive vehicle by the use of the correction coefficient calculated by the correction coefficient-calculating means.

The above and other objects, features, and advantages of the invention will become more apparent from the following detailed description taken in conjunction with the accompanying drawings.

BRIEF DESCRIPTION OF THE DRAWINGS

FIG. 2 is a block diagram showing functions of the control system for calculating desired drive shaft torque (TDSCMD);

FIG. 9 shows an estimated output map for use in determining the estimated value of the driver's intention of acceleration from the membership values calculated by the FIGS. 6B and 6C subroutines;

FIGS. 10A to 10C show tables corresponding to respective membership functions for use in further calculating the estimated value of the driver's intention of acceleration from the cumulative value of the estimated value of the driver's intention of acceleration;

FIG. 12 shows a table for use in determination of the driver's starting operation variation-dependent correction coefficient KHSN based on an average value GAVE of a maximal value of starting acceleration of the vehicle;

FIG. 14A shows a map for use in determining the correction coefficient KAP for correcting the detected value of the accelerator pedal position AP;

FIG. 14B shows a map for use in determining the desired drive shaft torque TDSCMD;

FIGS. 15A to 15C show examples of changes in the accelerator pedal position, the vehicle speed, and the acceleration; and FIGS. 16A to 16E collectively form a timing chart which is useful in explaining a manner of calculation of the driver's starting operation variation-dependent correction coefficient KHSN.

DETAILED DESCRIPTION

The invention will now be described in detail with reference to the drawings showing an embodiment thereof.

Figure 1:
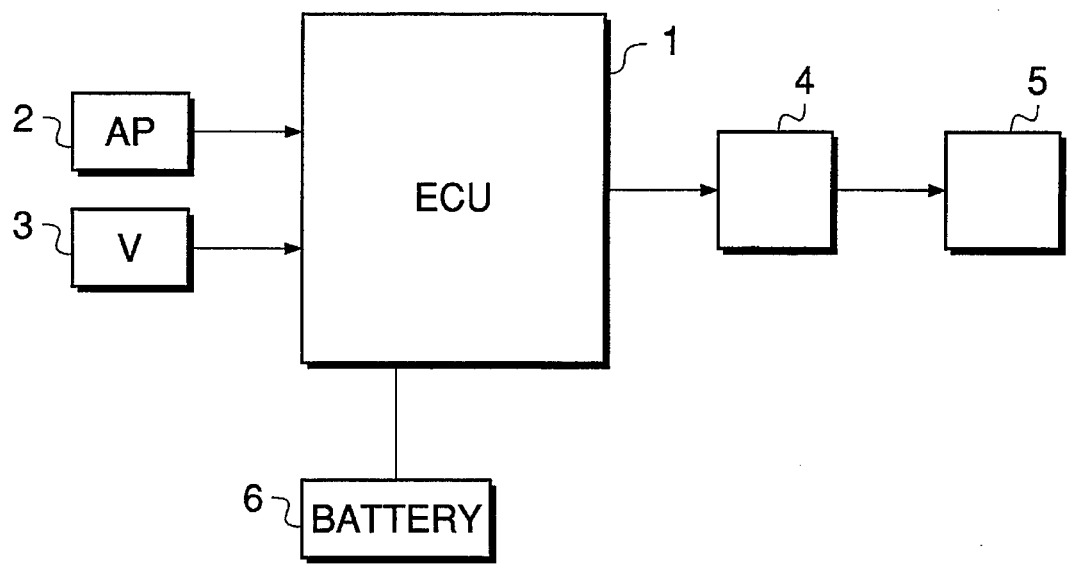
FIG. 1 is a block diagram showing the arrangement of a control system for an automotive vehicle, which incorporates a driving force-calculating system according to an embodiment of the invention.

Referring first to FIG. 1, there is shown the arrangement of a control system for an automotive vehicle incorporating a driving force-calculating system according to an embodiment of the invention. In the figure, reference numeral 1 designates an electronic control unit (hereinafter referred to as "the ECU"), which is installed on the automotive vehicle driven by an internal combustion engine, not shown. Connected to the ECU 1 are a battery 6 as a power source, an accelerator position sensor 2 for detecting the position or stepping amount AP of an accelerator pedal of the vehicle (hereinafter referred to as "the accelerator position") and a vehicle speed sensor 3 for detecting the vehicle speed V.

The accelerator position sensor 2 and the vehicle speed sensor 3 supply electric signals indicative of the sensed accelerator position AP and the sensed vehicle speed V to the ECU 1. Also connected to the ECU 1 is an actuator 4 for driving a throttle valve 5 arranged in an intake pipe, not shown, of the engine.

The ECU 5 is comprised of an input circuit having the functions of shaping the waveforms of input signals from various sensors including the accelerator position sensor 2 and the vehicle speed sensor 3, shifting the voltage levels of sensor output signals to a predetermined level, converting analog signals from analog-output sensors to digital signals, and so forth, a central processing unit (hereinafter referred to as "the CPU"), a memory device storing various operational programs which are executed by the CPU, and for storing results of calculations therefrom, etc., and an output circuit which outputs driving signals to the actuator 4, etc.

The ECU 1 calculates desired drive shaft torque TDSCMD required by the vehicle, based on signals received from the sensors 2 and 3, and calculates desired opening of the throttle valve 5 to such a value that the engine provides the calculated desired drive shaft torque TDSCMD. The actuator 4 is controlled such that the opening of the throttle valve 5 becomes equal to the calculated desired throttle valve opening value.

FIG. 2 shows functions of the control system for calculating the desired drive shaft torque TDSCMD from the detected values of the accelerator position AP and the vehicle speed V. The functions shown in the figure are realized by arithmetic operations executed by the ECU 1, as will be described hereinafter.

In the figure, DAP, VAVE and ΔV represent an amount of change in the accelerator position AP, an average value of the vehicle speed, and an amount of change in the vehicle speed V, respectively. These parameters are calculated from the detected values of the accelerator position AP and the vehicle speed V.

A block 101 carries out a first accelerating intention inference for inferring or estimating the driver's intention of acceleration based on the accelerator position AP and the amount of change DAP in the accelerator position AP to calculate an estimated value ACCM of the driver's intention of acceleration. A block 102 is connected to the block 101 and calculates a cumulative value ACCSUM of the estimated value ACCM of the driver's intention of acceleration. A block 103 is connected to the block 102 and carries out a second accelerating intention inference based on the cumulative value ACCSUM to determine membership values y1, y2, and y3.

A block 104 estimates a traveling condition (degree of traffic congestion) of a road or street on which the vehicle is traveling, based on the average vehicle speed VAVE to determine membership values x1, x2 and x3, and a block 105 calculates a correction coefficient KHSN dependent upon the driver's starting operation variation, based on the amount of change ΔV of the vehicle speed V.

A block 106 is connected to the blocks 103, 104, and 105 and calculates a desired drive shaft torque correction coefficient KAP based on the membership values y1 to y3 representative of the driver's intention of acceleration, the membership values x1 to x3 representative of the degree of traffic congestion, and the correction coefficient KHSN. A block 107 is connected to the block 106 and multiplies the detected value of the accelerator position AP by the desired drive shaft torque correction coefficient KAP to obtain a corrected accelerator position APFZ. A block 108 is connected to the block 107 and calculates the desired drive shaft torque TDSCMD based on the corrected accelerator position APFZ and the detected value of the vehicle speed V.

Figure 3:
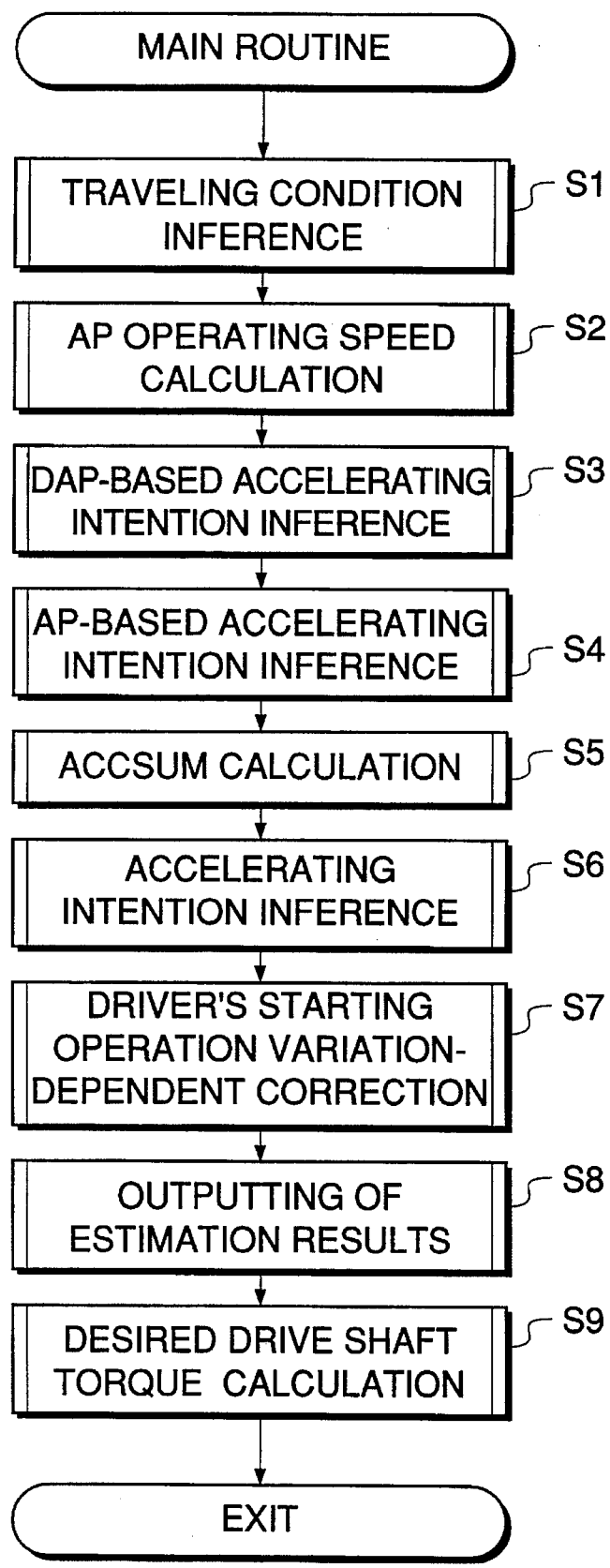
FIG. 3 is a flowchart showing a main routine executed by an ECU appearing in FIG. 1 to exhibit the FIG. 2 functions.

FIG. 3 shows a main routine for exhibiting the functions in FIG. 2 described above, which is executed by the ECU 1 at predetermined time intervals (e.g. 20 ms).

First, at a step S1, the traveling condition of the vehicle is inferred, i.e. the arithmetic operation of the block 104 in FIG. 2 is executed to calculate the membership values x1 to x3. At a step S2, the operating speed of the accelerator pedal, i.e. the amount of change DAP in the accelerator position AP is calculated. At a step S3, membership values u1 and u2 are calculated from the amount of change DAP, and at a step S4, membership values v1 and v2 are calculated from the accelerator position AP. At a step S5, the estimated value ACCM of the driver's intention of acceleration is calculated by the use of these membership values, and the cumulative value ACCSUM is calculated from the estimated value ACCM.

At the following step S6, the membership values y1 to y3 are calculated from the cumulative value ACCSUM, and at a step S7, the driver's starting operation variation-dependent correction coefficient KHSN is calculated from the amount of change ΔV in the vehicle speed V. Then, at a step S8, the desired drive shaft torque correction coefficient KAP is calculated from the membership values x1 to x3, y1 to y3 and the correction coefficient KHSN, and at a step S9, the desired drive shaft torque TDSCMD is calculated based on the accelerator position AP, the vehicle speed V and the correction coefficient KAP, followed by terminating the program.

Next, details of each step of the FIG. 3 main routine will be described.

Figure 4:
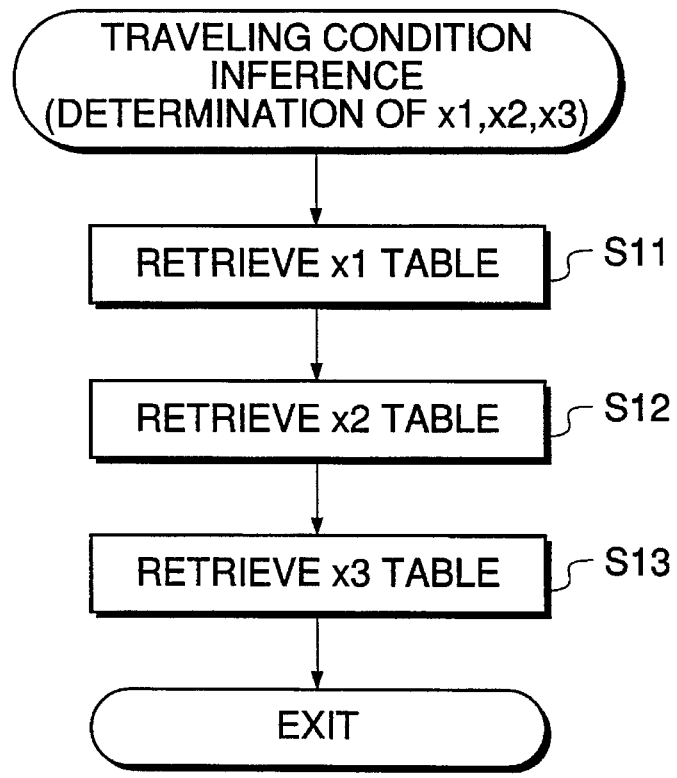
FIG. 4 is a flowchart showing a subroutine for determining membership values for use in inference of traveling conditions of the vehicle.
Figure 5A:
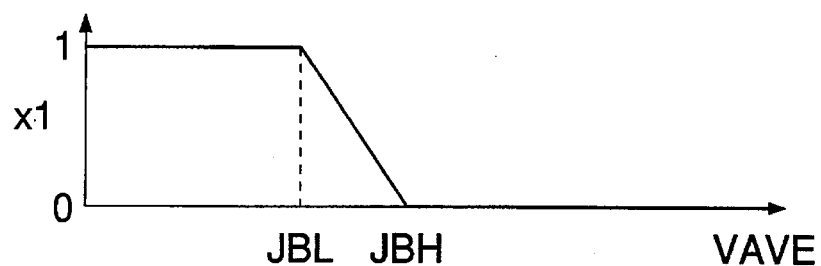
FIGS. 5A to 5C show tables corresponding to respective membership functions for use in inference of traveling conditions of the vehicle.
Figure 5B:
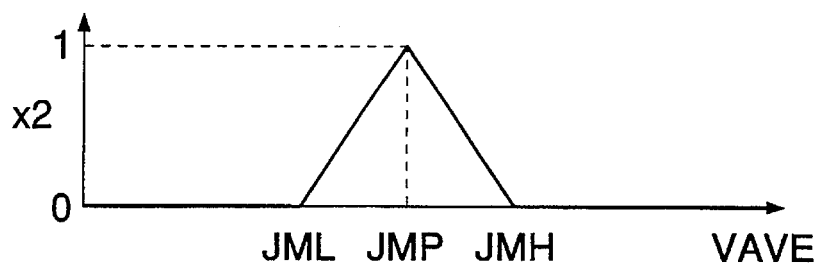
Figure 5C:
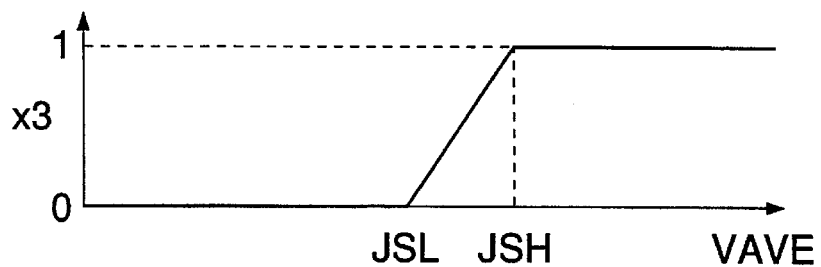

FIG. 4 shows a subroutine for executing the step S1 of the FIG. 3 main routine. In this subroutine, tables shown in FIGS. 5A to 5C are retrieved according to the average vehicle speed VAVE to determine the membership value (large congestion degree membership value) x1, the membership value (medium congestion degree membership value) x2, and the membership value (small congestion degree membership value) x3, at respective steps S11 to S13. The FIGS. 5A to 5C tables are for determining, respectively, membership functions for estimating the large congestion degree membership value x1, the medium congestion degree membership value x2, and the small congestion degree membership value x3. Predetermined values JBL and JBH of the FIG. 5A table correspond e.g. to 10 km/h and 55 km/h, respectively. Predetermined values JML, JMP, and JMH of the FIG. 5B table correspond e.g. to 10 km/h, 55 km/h, 100 km/h, respectively, and predetermined value JSL and JSH of the FIG. 5C table correspond e.g. to 55 km/h and 100 km/h, respectively.

Figure 6A:
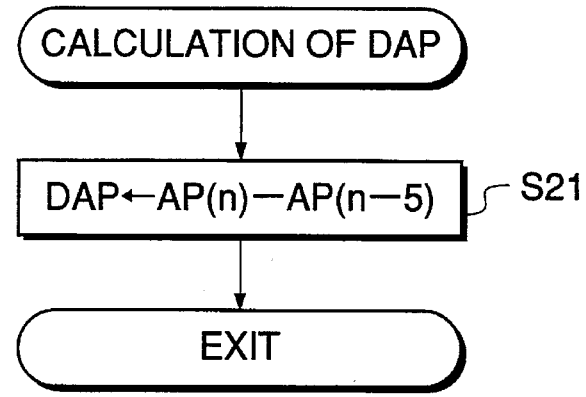
FIGS. 6A to 6C are flowcharts of routines for determining respective membership values for use in inference of the driver's intention of acceleration.
Figure 6B:
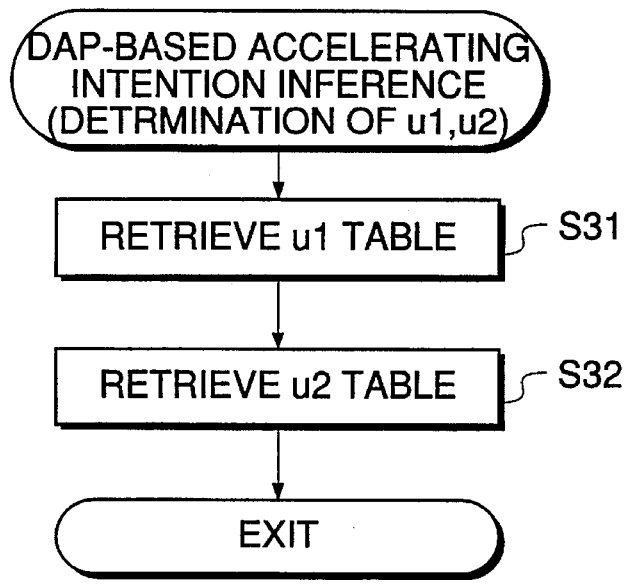
Figure 6C:
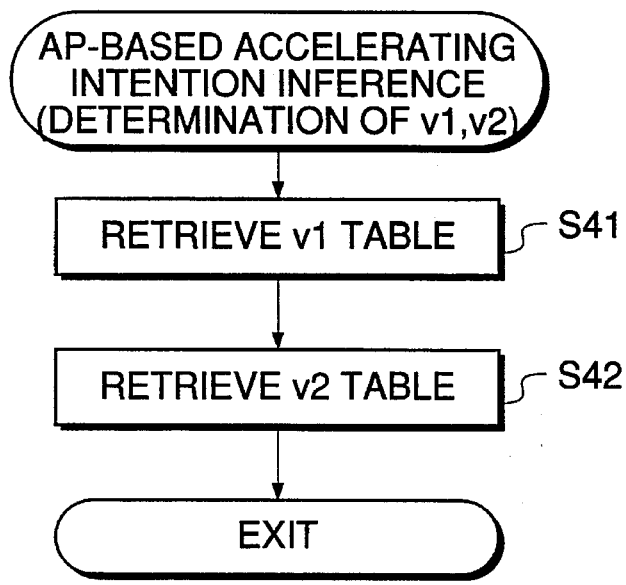

FIGS. 6A to 6C show subroutines for executing the steps S2 to S4 of the FIG. 3 main routine, respectively.

At a step S21 of the FIG. 6A subroutine, the amount of change DAP in the accelerator position AP is calculated by the use of the following equation (1):

$$DAP = AP(n) - AP(n-5) \quad (1)$$

where the AP value with the suffix (n) represents a value obtained in the present loop or cycle, and the AP value with the suffix (n−5) a value obtained five loops or cycles before the present loop or cycle. In the present embodiment, one cycle corresponds to a time period of 20 ms, and hence the DAP value corresponds to an amount of change in the accelerator position AP over a time period of 100 ms. Throughout the present specification, parameters without suffixes (n), (n−1), . . . (n−5) represent present values thereof.

Figure 7A:
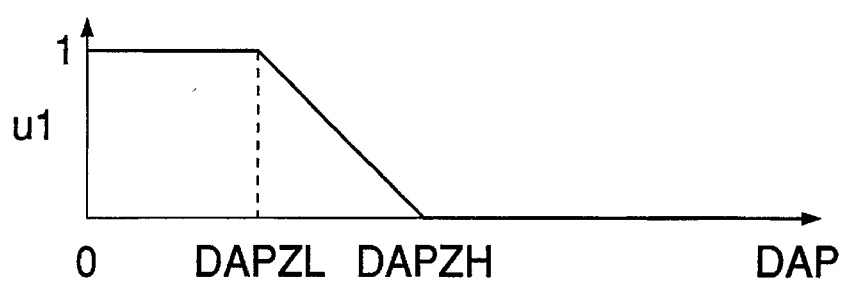
FIGS. 7A to 7D show tables corresponding to respective membership functions for use in inference of the driver's intention of acceleration.
Figure 7B:
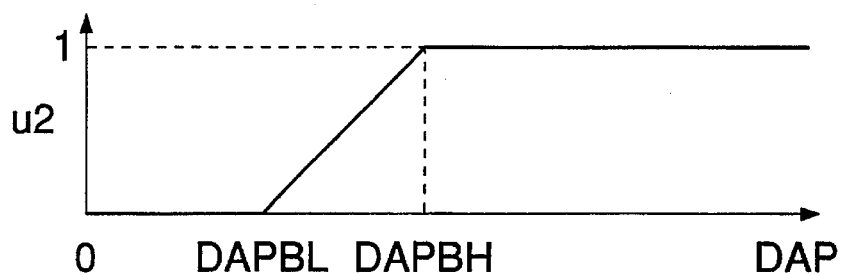

At steps S31 and S32 of the FIG. 6B subroutine, tables shown in FIGS. 7A and 7B are retrieved to calculate the membership value (DAP-based zero accelerating intention inference membership value) u1 and the membership value (DAP-based large accelerating intention inference membership value) u2 according to the DAP value. FIGS. 7A and 7B tables are for determining, respectively, membership functions for estimating the DAP-based zero accelerating intention inference membership value u1 and the DAP-based large accelerating intention inference membership value u2. Predetermined values DAPZL and DAPZH of the FIG. 7A table correspond to 0.25 degrees and 1 degree, respectively, and predetermined values DAPBL and DAPBH of the FIG. 7B table correspond to 0.25 degrees and 1 degree.

Figure 7C:
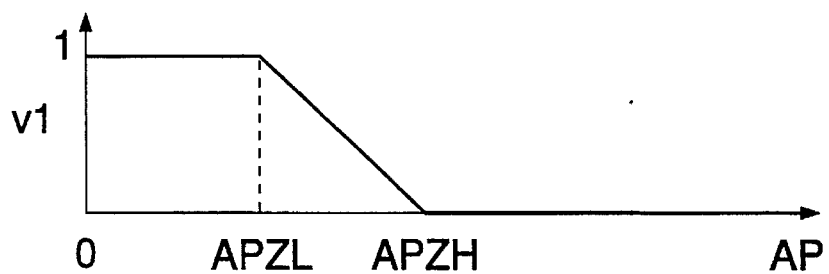
Figure 7D:
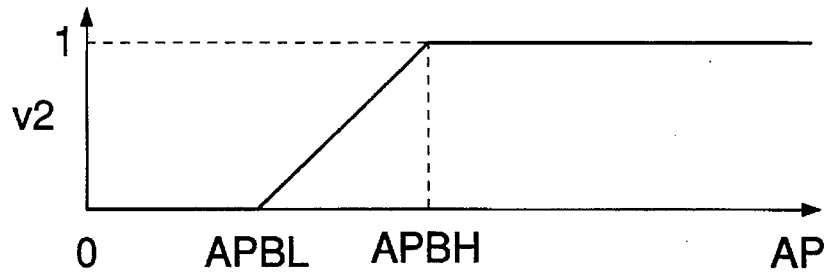

At steps S41 and S42 of the FIG. 6C subroutine, tables shown in FIGS. 7C and 7D are retrieved to determine the membership value (AP-based zero accelerating intention inference membership value) v1 and the membership value (AP-based large accelerating intention inference membership value) v2 according to the AP value. FIGS. 7C and 7D tables are for determining, respectively, membership functions for estimating the AP-based zero accelerating intention inference membership value v1 and the AP-based large accelerating intention inference membership value v2. Predetermined values APZL and APZH of the FIG. 7C table correspond to 10 degrees and 60 degrees, respectively, and predetermined values APBL and APBH of the FIG. 7D table correspond to 10 degrees and 60 degrees, respectively.

Figure 8:
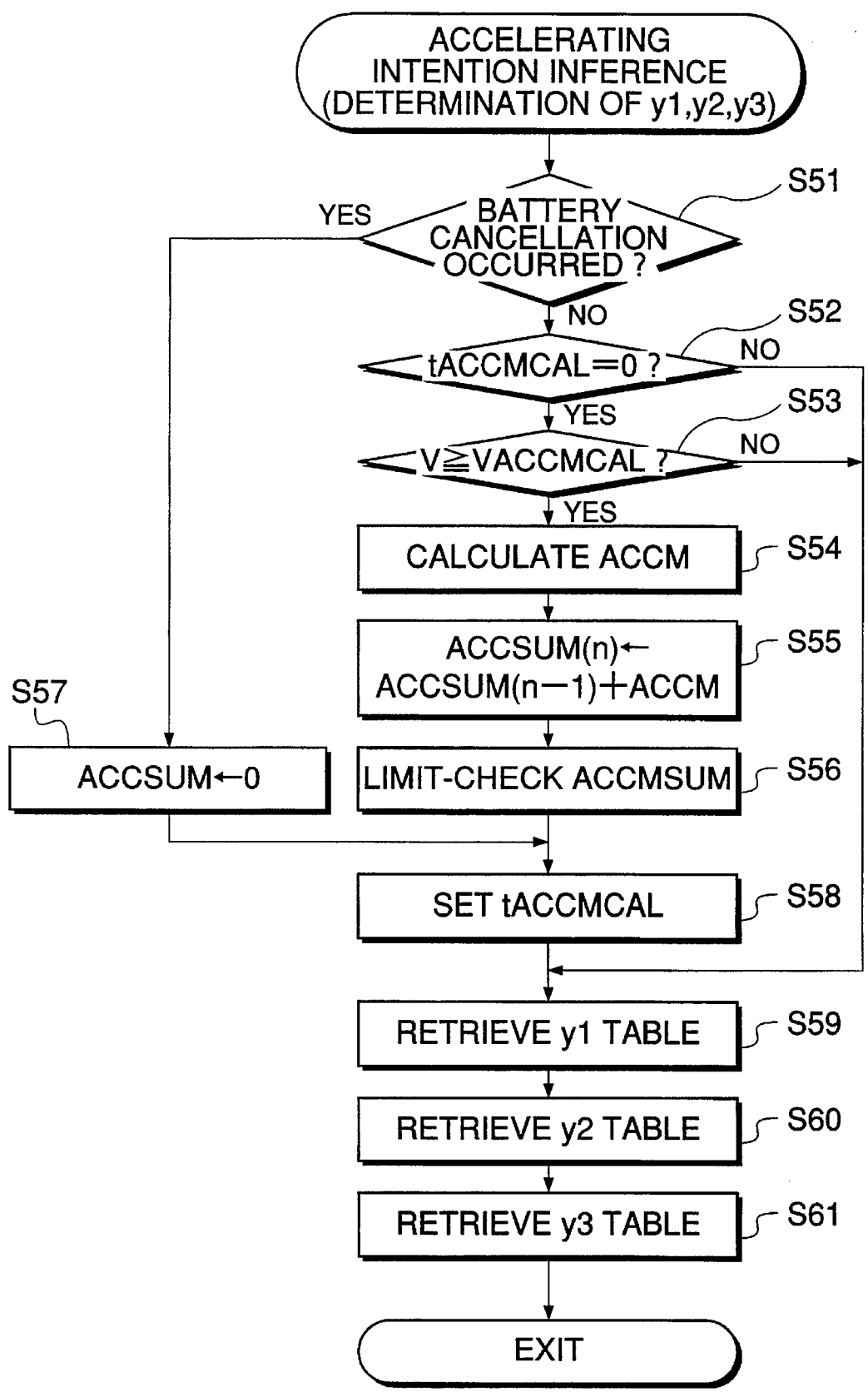
FIG. 8 is a flowchart showing a subroutine for calculating an estimated value of the driver's intention of acceleration and a cumulative value of the same, and further calculating membership values for use in inference of the driver's intention of acceleration.

FIG. 8 shows a subroutine for executing the steps S5 and S6 of the FIG. 3 main routine.

First, at a step S51, it is determined whether or not battery cancellation has occurred, i.e. whether or not the contents of the memory device within the ECU 1 backed up by the battery 6 have been lost due to removal of the battery 6 or a drop in the output voltage of the same. If the battery cancellation has occurred, the cumulative value ACCSUM is reset to "0" at a step S57, and then the program proceeds to a step S58.

When the battery cancellation has not occurred, the program proceeds to a step S52, wherein it is determined whether or not the count tACCMCAL of a tACCMCAL timer is equal to "0". The tACCNAL timer is a downcount timer which is set to a predetermined time period TACCMCAL (e.g. 100 msec.) at the step S58, as described below. When this question is first made, tACCMCAL=0 holds, so that the program proceeds to a step S53 wherein it is determined whether or not the vehicle speed V is equal to or higher than a predetermined lower limit value VACCMCAL (e.g. 0.1 km/h). If V<VACCMCAL holds, the program jumps to a step S59, whereas if V≧VACCMCAL holds, the estimated value ACCM of the driver's intention of acceleration is calculated at a step S54 by the use of the following equation (2):

$$ACCM = \sum_{i=1}^{2} \sum_{j=1}^{2} uivjwij / \sum_{i=1}^{2} \sum_{j=1}^{2} uivj \quad (2)$$

where wij (i=1, 2, j=1, 2) represents an estimated value of output read from an output map shown in FIG. 9, in which w11 represents an estimated output value which is to be read when the DAP-based driver's intention of acceleration is zero and at the same time the AP-based driver's intention of acceleration is zero, w12 an estimated output value read when the DAP-based driver's intention of acceleration is zero and at the same time the AP-based driver's intention of acceleration is large, w21 an estimated output value read when the DAP-based driver's intention of acceleration is large and at the same time the AP-based driver's intention of acceleration is zero, and w22 an estimated output value read when the DAP-based driver's intention of acceleration is large and at the same time the AP-based driver's intention of acceleration is large. The map values are set e.g. such that w11=−0.1, w12=0.12, w21=0.2, and w22=0.5.

Then, the cumulative value ACCSUM of the estimated value ACCM of the driver's intention of acceleration is calculated at a step S55 by the use of the following equation (3):

$$ACCSUM(n) = ACCSUM(n-1) + ACCM \quad (3)$$

Then, limit-checking of the calculated ACCSUM value is carried out at a step S56, wherein if the calculated ACCSUM value is larger than a predetermined upper limit value, it is set to the predetermined upper limit value, while if the calculated ACCSUM value is smaller than a predetermined lower limit value, it is set to the predetermined lower limit value.

At the following step S58, the tACCMCAL timer is set to the predetermined time period TACCMCAL and started, followed by the program proceeding to the step S59. Accordingly, when the subroutine is executed in the next loop, the answer to the question of the step S52 becomes negative (NO), so that the program jumps from the step S52 to the step S59. Thereafter, if the vehicle speed V is equal to or higher than the predetermined value VACCMAL, the ACCM value and the ACCSUM value are calculated whenever the predetermined time period TACMCAL elapses.

At the following steps S59 to S61, the membership values y1 to y3 are calculated based on the cumulative value ACCSUM of the estimated value ACCM of the driver's intention of acceleration, followed by terminating the program.

Tables shown in FIGS. 10A to 10C are retrieved at the steps S59 to S61, respectively, according to the cumulative value ACCSUM to determine the membership value (ACCSUM-based zero accelerating intention inference membership value) y1, the membership value (ACCSUM-based small accelerating intention inference membership value) y2, and the membership value (ACCSUM-based large accelerating intention inference membership value) y3. FIGS. 10A to 10C tables are for determining, respectively, membership functions for estimating the ACCSUM-based zero accelerating intention inference membership value y1, the ACCSUM-based small accelerating intention inference membership value y2, and the ACCSUM-based large accelerating intention inference membership value y3. Predetermined values AMZL and AMZH of the in FIG. 10A table correspond e.g. to 0.5 and 1.0, respectively. Predetermined values AMSL, AMSP and AMSH of the FIG. 10B table correspond e.g. to 0.5, 1.0 and 1.5, respectively. Predetermined values AMBL and AMBH of the FIG. 10C table correspond e.g. to 1.0 and 1.5, respectively.

Figure 11:
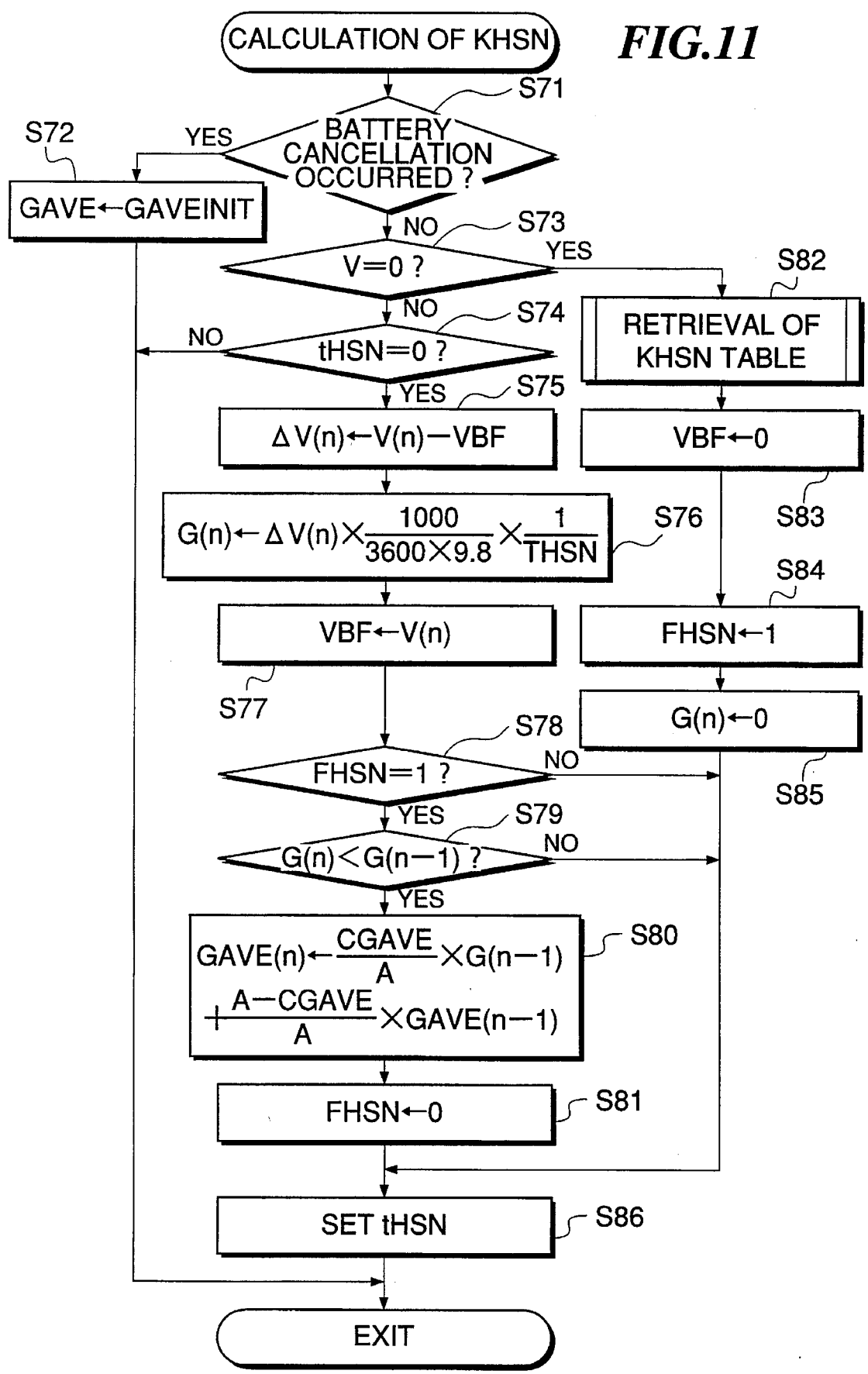
FIG. 11 is a flowchart showing a subroutine for calculating a correction coefficient KHSN depending upon the driver's starting operation variation corresponding to the driver's driving characteristic, based on an amount of change in the vehicle speed.

FIG. 11 shows a subroutine for executing the step S7 of FIG. 3 to calculate the driver's starting operation variation-dependent correction coefficient KHSN.

First, at a step S71, it is determined whether or not the battery cancellation has occurred. If the battery cancellation has occurred, an average value GAVE of maximum starting acceleration to be calculated at a step S80, referred to hereinafter, is set to an initial value GAVEINIT at a step S72, followed by terminating the program.

If the battery cancellation has not occurred, it is determined at a step S73 whether or not the vehicle speed V is equal to "0". If the vehicle speed V is not equal to "0", i.e. if the vehicle is traveling, it is determined at a step S74 whether or not the count tHSN of a tHSN counter, which is set to a predetermined value THSN (e.g. 500 msec.) at a step S86, is equal to "0". Before the predetermined time period THSN elapses after execution of the step S86, the answer to this question of the step S74 is negative (NO), and then the program is immediately terminated.

If tHSN=0 holds at the step S74, the amount of change $\Delta V(n)$ in the vehicle speed V is calculated by the use of the following equation (3):

$$\Delta V(n) = V(n) - VBF \quad (3)$$

where VBF represents a value of the vehicle speed V assumed when the immediately preceding value of the amount of change $\Delta V(n)$ was calculated the predetermined time period THSN before (see a step S77; this value will be referred to hereinafter as "the immediately preceding vehicle speed value").

At the following step S76, a value of acceleration G(n) is calculated by the use of the following equation (4):

$$G(n) = \Delta V(n) \times [1000/(3600 \times 9.8)] \times 1/THSN \quad (4)$$

At the following step S77, the value of the vehicle speed V detected and used in the present loop is set to the immediately preceding vehicle speed value VBF, and then it is determined at a step S78 whether or not a starting flag FHSN assumes "1", which is set to "0" when the calculation of the average maximum starting acceleration value GAVE has been completed, to indicate the completion of calculation of the GAVE value. If FHSN=1 holds at the step S78, which means that the calculation of the GAVE value has not been completed, it is determined at a step S79 whether or not the present value G(n) of the acceleration calculated at the step S76 is smaller than the immediately preceding value G(n−1). If G(n)≧G(n−1) holds, the present program is immediately terminated.

If G(n)<G(n−1) holds at the step S79, it means that the immediately preceding value G(n−1) is the maximum starting acceleration value, so that the average maximum starting acceleration value GAVE is calculated at the step S80 by the use of the following equation (5):

$$GAVE(n) = (CGAVE/A) \times G(n-1) + [(A-CGAVE)/A] \times GAVE(n-1) \quad (5)$$

where A represents a predetermined value set e.g. to 10000HEX, and CGAVE an averaging coefficient set e.g. to 100HEX.

At the following step S81, the starting flag FHSN is set to "0", whereby the answer to the question of the step S78 becomes negative (NO) from this time on, which prevents the GAVE value from being calculated so long as the vehicle continues to be traveling. Then, the tHSN timer is set to the predetermined value THSN and started at the step S86, followed by terminating the program.

If V=0 holds at the step S73, which means the vehicle is in stoppage, a KHSN table is retrieved according to the average maximum starting acceleration value GAVE to calculate the driver's starting operation variation-dependent correction coefficient KHSN at a step S82. The KHSN table is set e.g. as shown in FIG. 12 such that as the GAVE value increases, the KHSN value becomes larger.

Then, the immediately preceding vehicle speed value VBF is set to "0" at a step S83, the starting flag FHSN is set to "1" at a step S84, the acceleration value G(n) is set to "0" at a step S85, followed by the program proceeding to the step S86.

According to the present processing, the average value GAVE of the maximum starting acceleration of the vehicle is calculated, and the driver's starting operation variation-dependent correction coefficient KHSN is calculated according to the calculated GAVE value. FIGS. 15A to 15C show examples of changes in the accelerator position AP, the vehicle speed V and the acceleration G occurring when the vehicle is being started. As shown in FIG. 15C, there is a time point at which the acceleration G assumes the maximum value during the starting of the vehicle, and as shown in FIGS. 16A to 16E, whenever the vehicle is started, the maximum acceleration value GMAX is detected and averaged to thereby obtain the average maximum starting acceleration value GAVE as a parameter indicative of the driver's starting operation characteristic which can vary depending upon individual drivers. The reason for employment of the starting acceleration to determine the driver's starting operation variation is that the starting acceleration is most exactly reflective of variation in the driving characteristic between drivers.

Figure 13A:
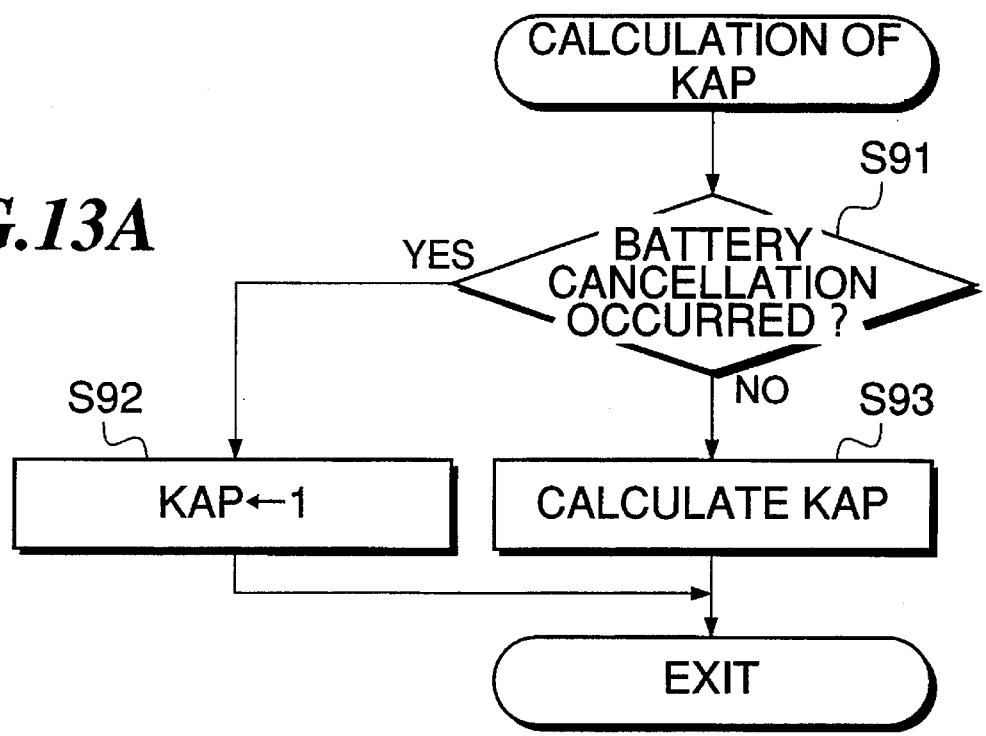
FIG. 13A is a flowchart showing a subroutine for calculating a correction coefficient KAP for correcting a detected value of the accelerator pedal position AP.

FIG. 13A shows a subroutine for executing the step S8 of the FIG. 3 main routine to calculate the desired drive shaft torque correction coefficient KAP.

First, at a step S91, it is determined whether or not the battery cancellation has occurred. If the battery cancellation has occurred, the correction coefficient KAP is set to "1" at a step S92, whereas if the battery cancellation has not occurred, the correction coefficient KAP is calculated by the use of the following equation (6):

$$KAP = \left[ KHSN \times \sum_{j=1}^{3} x1yj\alpha 1j + \sum_{i=2}^{3}\sum_{j=1}^{3} xiyj\alpha ij \right] / \sum_{i=1}^{3}\sum_{j=1}^{3} xiyj \quad (6)$$

where $\alpha ij$ (i=1–3, j=1–3) represents an estimated value of output read from an output map shown in FIG. 14A, in which $\alpha 11$ represents an estimated output value which is to be read when the degree of traffic congestion is high and at the same time the ACCSUM-based driver's intention of acceleration is zero, $\alpha 12$ an estimated output value read when the degree of traffic congestion is high and at the same time the ACCSUM-based driver's intention of acceleration is small, $\alpha 13$ an estimated output value read when the degree of traffic congestion is high and at the same time the ACCSUM-based driver's intention of acceleration is large, $\alpha 21$ an estimated output value read when the degree of traffic congestion is medium and at the same time the ACCSUM-based driver's intention of acceleration is zero, $\alpha 22$ an estimated output value read when the degree of traffic congestion is medium and at the same time the ACCSUM-based driver's intention of acceleration is small, $\alpha 23$ an estimated output value read when the degree of traffic congestion is medium and at the same time the ACCSUM-based driver's intention of acceleration is large, $\alpha 31$ an estimated output value read when the degree of traffic congestion is low and at the same time the ACCSUM-based driver's intention of acceleration is zero, $\alpha 32$ an estimated output value read when the degree of traffic congestion is low and at the same time the ACCSUM-based driver's intention of acceleration is small, and $\alpha 33$ an estimated output value read when the degree of traffic congestion is low and at the same time the ACCSUM-based driver's intention of acceleration is large. These map values are set e.g. such that $\alpha 11=0.4$, $\alpha 12=0.5$, $\alpha 13=1.0$, $\alpha 21=1.0$, $\alpha 22=1.5$, $\alpha 23=2.0$, $\alpha 31=1.6$, $\alpha 32=1.8$, and $\alpha 33=2.0$.

The KAP value calculated by the above equation (6) reflects the driver's intention of acceleration (y1 to y3), the degree of traffic congestion (x1 to x2), and the driving characteristic of the individual driver (KHSN).

Figure 13B:
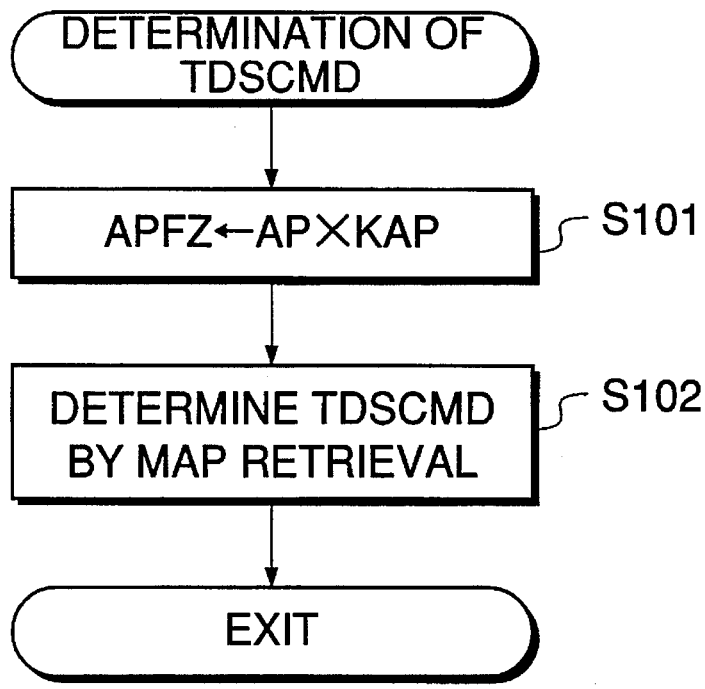
FIG. 13B is a flowchart showing a subroutine for calculating the desired drive shaft torque TDSCMD.

FIG. 13B shows a subroutine for executing the step S9 of the FIG. 3 main routine.

First, at a step S101, the accelerator position AP is multiplied by the desired drive shaft torque correction coefficient KAP by the use of the following equation (7) to calculate the corrected accelerator position APFZ.

$$APFZ = AP \times KAP \qquad (7)$$

Then, a TDS map shown in FIG. 14B is retrieved according to the corrected accelerator position APFZ and the vehicle speed V, and an interpolation is carried out on the read map values, if necessary, to calculate the desired drive shaft torque TDSCMD at a step S102. In FIG. 14B, APFZi (i=0–11) represents a predetermined value of the accelerator position, and Vj (j=0–21) a predetermined value of the vehicle speed V. The map values TDSij (i=0–11, j=0–21) are provided at respective lattice points defined by these parameters.

As described heretofore, according to the present embodiment, the average maximum starting acceleration GAVE reflective of the driving characteristic of each individual driver is calculated, and the desired drive shaft torque correction coefficient KAP is calculated based on the driver's starting operation variation-dependent correction coefficient KHSN determined based on the GAVE value, the degree of traffic congestion, and the driver's intention of acceleration. Then, the desired drive shaft torque TDSCMD is calculated based the KAP-corrected accelerator position APFZ and the vehicle speed V. This makes it possible to obtain values of the desired drive shaft torque suitable for respective driving characteristics of individual drivers. As a result, the drivability of the vehicle can be enhanced irrespective of the driver's driving characteristic.

Although in the above described embodiment, the average maximum starting acceleration is used as a parameter reflecting the driving characteristics of individual drivers, this is not limitative, but the average maximum starting acceleration may be replaced by an average maximum starting driving force obtained by multiplying the average maximum acceleration by the weight of the vehicle.

What is claimed is:

1. A driving force-calculating system for calculating a desired driving force required by an automotive vehicle depending on operating conditions of said vehicle, comprising:

vehicle speed change-calculating means for calculating an amount of change in speed of said automotive vehicle assumed during acceleration of said automotive vehicle;

parameter-calculating means for calculating a kinetic energy parameter representative of kinetic energy of said automotive vehicle from an output from said vehicle speed change-calculating means;

maximal value-calculating means for calculating a maximal value of an output from said parameter-calculating means within a predetermined time period;

maximal value-averaging means for calculating an average value of said maximal value calculated by said maximal value-calculating means;

correction coefficient-calculating means for calculating a correction coefficient based on said average value calculated by said maximal value-averaging means; and desired driving force-calculating means for calculating said desired driving force required by said automotive vehicle by the use of said correction coefficient calculated by said correction coefficient-calculating means.

2. A driving force-calculating system according to claim 1, wherein said kinetic energy parameter is acceleration of said automotive vehicle.

3. A driving force-calculating system according to claim 1, wherein said kinetic energy parameter is a driving force obtained by multiplying said acceleration of said automotive vehicle by weight of said automotive vehicle.

4. A driving force-calculating system according to claim 2, wherein said vehicle has an accelerator pedal, said driving force-calculating system including stepping amount-detecting means for detecting a stepping amount of said accelerator pedal, said desired driving force-calculating means correcting said stepping amount of said accelerator pedal by said correction coefficient and calculating said desired driving force by the use of the corrected stepping amount of said accelerator pedal.

5. A driving force-calculating system according to claim 3, wherein said vehicle has an accelerator pedal, said driving force-calculating system including stepping amount-detecting means for detecting a stepping amount of said accelerator pedal, said desired driving force-calculating means correcting said stepping amount of said accelerator pedal by said correction coefficient and calculating said desired driving force by the use of the corrected stepping amount of said accelerator pedal.

6. A driving force-calculating system according to claim 4, wherein said maximal value-averaging means averages said maximal value during traveling of said vehicle, said correction coefficient-calculating means calculating said correction coefficient when said vehicle is in stoppage.

7. A driving force-calculating system according to claim 5, wherein said maximal value-averaging means averages said maximal value during traveling of said vehicle, said correction coefficient-calculating means calculating said correction coefficient when said vehicle is in stoppage.

8. A driving force-calculating system according to claim 2, wherein said predetermined time period is a fixed time period elapsed immediately after said automotive vehicle starts from a standing state in which the speed of said automotive vehicle is zero.

9. A driving force-calculating system according to claim 3, wherein said predetermined time period is a fixed time period elapsed immediately after said automotive vehicle starts from a standing state in which the speed of said automotive vehicle is zero.

10. A driving force-calculating system according to claim 4, including accelerating intention-estimating means for calculating an estimated value of driver's intention of acceleration based on said stepping amount of said accelerator pedal and an amount of change in said stepping amount of said accelerator pedal, and wherein said correction coefficient-calculating means calculates said correction coefficient based on a driver's starting operation variation-dependent correction coefficient calculated based on said estimated value of driver's intention of acceleration and said average value calculated by said maximal value-averaging means.

11. A driving force-calculating system according to claim 5, including accelerating intention-estimating means for calculating an estimated value of driver's intention of acceleration based on said stepping amount of said accelerator pedal and an amount of change in said stepping amount of said accelerator pedal, and wherein said correction coefficient-calculating means calculates said correction coefficient based on a driver's starting operation variation-dependent correction coefficient calculated based on said estimated value of driver's intention of acceleration and said average value calculated by said maximal value-averaging means.

12. A driving force-calculating system according to claim 10, including traveling state-estimating means for calculating an estimated value of a traveling state of said automotive vehicle based on an average value of the speed of said automotive vehicle, said correction coefficient-calculating means calculating said correction coefficient additionally based on said estimated value of said traveling state of said automotive vehicle.

13. A driving force-calculating system according to claim 11, including traveling state-estimating means for calculating an estimated value of a traveling state of said automotive vehicle based on an average value of the speed of said automotive vehicle, said correction coefficient-calculating means calculating said correction coefficient additionally based on said estimated value of said traveling state of said automotive vehicle.

14. A driving force-calculating system according to claim 4, wherein said desired driving force-calculating means calculates said desired driving force required by said automotive vehicle based on the corrected stepping amount of said accelerator pedal and the speed of said automotive vehicle.

15. A driving force-calculating system according to claim 5, wherein said desired driving force-calculating means calculates said desired driving force required by said automotive vehicle based on the corrected stepping amount of said accelerator pedal and the speed of said automotive vehicle.

16. In a control system for an automotive vehicle having an internal combustion engine installed thereon, said engine having an intake passage, a throttle valve arranged in said intake passage, throttle valve-driving means for driving said throttle valve, desired throttle valve opening-calculating means for calculating a desired throttle valve opening value for said throttle valve-driving means, and control means for controlling said throttle valve-driving means such that an actual opening value of said throttle valve becomes equal to said desired throttle valve opening value, said control system including a driving force-calculating system for calculating said desired driving force depending on operating conditions of said vehicle, the improvement comprising:

vehicle speed change-calculating means for calculating an amount of change in speed of said automotive vehicle assumed during acceleration of said automotive vehicle;

parameter-calculating means for calculating a kinetic energy parameter representative of kinetic energy of said automotive vehicle from an output from said vehicle speed change-calculating means;

maximal value-calculating means for calculating a maximal value of an output from said parameter-calculating means within a predetermined time period;

maximal value-averaging means for calculating an average value of said maximal value calculated by said maximal value-calculating means;

correction coefficient-calculating means for calculating a correction coefficient based on said average value calculated by said maximal value-averaging means; and desired driving force-calculating means for calculating said desired driving force required by said automotive vehicle by the use of said correction coefficient calculated by said correction coefficient-calculating means.

17. A driving force-calculating system according to claim 16, wherein said kinetic energy parameter is acceleration of said automotive vehicle.

18. A driving force-calculating system according to claim 16, wherein said kinetic energy parameter is a driving force obtained by multiplying said acceleration of said vehicle by weight of said automotive vehicle.

19. A driving force-calculating system according to claim 17, wherein said vehicle has an accelerator pedal, said driving force-calculating system including stepping amount-detecting means for detecting a stepping amount of said accelerator pedal, said desired driving force-calculating means correcting said stepping amount of said accelerator pedal by said correction coefficient and calculating said desired driving force by the use of the corrected stepping amount of said accelerator pedal.

20. A driving force-calculating system according to claim 18, wherein said vehicle has an accelerator pedal, said driving force-calculating system including stepping amount-detecting means for detecting a stepping amount of said accelerator pedal, said desired driving force-calculating means correcting said stepping amount of said accelerator pedal by said correction coefficient and calculating said desired driving force by the use of the corrected stepping amount of said accelerator pedal.

* * * * *